(12) United States Patent
Franconi

(10) Patent No.: US 8,356,693 B2
(45) Date of Patent: Jan. 22, 2013

(54) OVERBOARD VENT VALVE FOR USE IN AN AIRCRAFT BEARING LUBRICATION SYSTEM

(75) Inventor: Robert B. Franconi, New Hartford, CT (US)

(73) Assignee: Honeywell International Inc., Morristown, NJ (US)

( * ) Notice: Subject to any disclaimer, the term of this patent is extended or adjusted under 35 U.S.C. 154(b) by 1586 days.

(21) Appl. No.: 11/860,214

(22) Filed: Sep. 24, 2007

(65) Prior Publication Data

US 2009/0078506 A1 Mar. 26, 2009

(51) Int. Cl.
F16C 9/00 (2006.01)
(52) U.S. Cl. ........................................................ 184/5.1
(58) Field of Classification Search .................... 184/5.1, 184/6.4, 6.12; 137/505.18, 505.13, 510; 138/43, 46; 244/1 R
See application file for complete search history.

(56) References Cited

U.S. PATENT DOCUMENTS

| | | | |
|---|---|---|---|
| 2,091,051 A * | 8/1937 | Mesinger | 137/505.18 |
| 2,437,187 A | 3/1948 | Eshbaugh | |
| 2,766,593 A | 10/1956 | Mitchell et al. | |
| 3,319,649 A * | 5/1967 | Cummins | 137/505.18 |
| 3,414,009 A | 12/1968 | Merchant | |
| 3,611,711 A * | 10/1971 | Mueller | 60/600 |
| 3,620,501 A | 11/1971 | Friedell | |
| 3,687,570 A | 8/1972 | Ellison | |
| 3,709,242 A | 1/1973 | Chase | |
| 3,774,628 A * | 11/1973 | Norton et al. | 137/115.15 |
| 3,828,743 A | 8/1974 | Ludwig | |
| 3,890,997 A * | 6/1975 | Dresler | 137/271 |
| 3,933,166 A | 1/1976 | Gould et al. | |
| 4,183,372 A | 1/1980 | Ueda et al. | |
| 4,391,290 A | 7/1983 | Williams | |
| 4,543,935 A * | 10/1985 | Tuckey | 123/463 |
| 4,622,815 A | 11/1986 | Piesche | |
| 4,815,699 A | 3/1989 | Mueller | |
| 4,815,928 A | 3/1989 | Pineo et al. | |
| 4,976,335 A * | 12/1990 | Cappellato | 184/6.4 |
| 5,848,608 A | 12/1998 | Ishigaki | |
| 5,947,144 A | 9/1999 | Mangano et al. | |
| 6,050,292 A | 4/2000 | Richman et al. | |
| 7,163,025 B2 | 1/2007 | Kajitani | |
| 7,174,926 B1 | 2/2007 | Grantham | |
| 2008/0116009 A1* | 5/2008 | Sheridan et al. | 184/6.4 |
| 2009/0250296 A1* | 10/2009 | Hannaford et al. | 184/6.2 |

FOREIGN PATENT DOCUMENTS

DE 19925773 A1 * 12/2000
JP 08093490 A * 4/1996

* cited by examiner

*Primary Examiner* — Timothy D Collins
*Assistant Examiner* — Robert T Reese
(74) *Attorney, Agent, or Firm* — Ingrassia Fisher & Lorenz, P.C.

(57) ABSTRACT

A pressure-regulated bearing assembly is provided for deployment within an aircraft bearing lubrication system. The pressure-regulated bearing assembly includes a vent valve and a bearing housing having an air cavity therein. The vent valve includes a valve housing having a main flow passage coupled to the air cavity. A valve element is disposed within the main flow passage and configured to move between (i) an open position and (ii) a closed position. A bellows is coupled to the valve element and configured to move the valve element from the open position to the closed position when the pressure within the air cavity surpasses a predetermined pressure threshold.

19 Claims, 3 Drawing Sheets

OVERBOARD VENT VALVE FOR USE IN AN AIRCRAFT BEARING LUBRICATION SYSTEM

TECHNICAL FIELD

The present invention relates generally to an aircraft bearing lubrication system and, more particularly, to an overboard vent valve for regulating the pressure within a lubricated aircraft bearing housing.

BACKGROUND

An aircraft's gas turbine engine is typically equipped with a bearing lubrication system that lubricates bearings supporting rotating shafts associated with the engine. One known bearing lubrication system continually directs a lubricant, such as oil, over the bearings utilizing a spray bar mounted in the bearing housing. After flowing over the bearings, the oil collects in a sump provided at the bottom of the bearing housing. The oil may then flow from the sump into an oil tank, which holds a large reservoir of oil. Under the influence of a supply pump, the oil may then be drawn from the oil tank and supplied to the spray bar, which again directs the oil over the bearings. This cycle is continually repeated to maintain the bearings at a proper lubrication.

An air cavity exists within the bearing housing above the sump. During flight, this air cavity may become pressurized due to leakage across the carbon seals of the gas turbine engine. To relieve this pressure, a conventional lubrication system may vent the air cavity (and, perhaps, the oil tank) to atmospheric pressure. As a result of this leakage and venting, the pressure within the air cavity fluctuates as a function of aircraft flight altitude. Thus, at high flight altitudes (e.g., 60,000 feet above sea level), the pressure within the air cavity may become extremely low; and, at low flight altitudes (e.g., 1,000 feet below sea level), the pressure within the air cavity may become relatively high. When the pressure within the air cavity becomes too low, pump cavitation may occur (i.e., the sudden formation and collapse of low pressure bubbles). Cavitation may increase wear on the supply pump and the other lubrication system components. In addition, cavitation may interrupt the continuity of oil flow and thus result in a non-uniform spray over the bearing. Conversely, when the pressure within the air cavity becomes too high, oil may leak from the lubrication system.

It is thus desirable to provide an overboard vent valve, and an aircraft bearing lubrication system employing such a vent valve, which maintains the pressure of the bearing housing's air cavity above a minimum pressure threshold to prevent pump cavitation. It would also be desirable if such an overboard vent valve also maintained the pressure of the bearing housing air cavity below a maximum pressure threshold to minimize or eliminate oil leakage. Other desirable features and characteristics of the present invention will become apparent from the subsequent detailed description of the invention and the appended claims, taken in conjunction with the accompanying drawings and this background of the invention.

BRIEF SUMMARY

A pressure-regulated bearing assembly is provided for deployment within an aircraft bearing lubrication system. The pressure-regulated bearing assembly includes a vent valve and a bearing housing having an air cavity therein. The vent valve includes a valve housing having a main flow passage coupled to the air cavity. A valve element is disposed within the main flow passage and configured to move between (i) an open position and (ii) a closed position. A bellows is coupled to the valve element and configured to move the valve element from the open position to the closed position when the pressure within the air cavity surpasses a predetermined pressure threshold.

There is also provided an overboard vent valve for deployment within an aircraft bearing lubrication system including a bearing housing having an air cavity therein. The overboard vent valve comprises a valve housing having a main flow passage including an inlet coupled to the air cavity and an outlet coupled to ambient pressure. A valve element is disposed within the main flow passage and configured to move between (i) an open position and (ii) a closed position wherein the valve obstructs fluid flow through the main flow passage. An evacuated bellows is coupled to the valve element and configured to move the valve element from the open position to the closed position when the inlet pressure falls below a predetermined pressure threshold. Lastly, a pressure balance device is mounted in the valve housing and coupled to the valve element.

There is further provided an aircraft bearing lubrication system for lubricating a bearing with a lubricant. The aircraft bearing lubrication system comprises a bearing housing, which supports the bearing and which includes a sump and an air cavity. A circulation subsystem includes a lubricant inlet fluidly coupled to the sump and a lubricant outlet positioned so as to direct lubricant over the bearing. The circulation subsystem conducts lubricant from the lubricant inlet to the lubricant outlet. The aircraft bearing lubrication system further comprises an overboard vent valve, which includes valve housing having a main flow passage. The main flow passage includes an inlet coupled to the air cavity and an outlet coupled to atmospheric pressure. A valve element is disposed within the main flow passage and configured to move between (i) an open position and (ii) a closed position wherein the valve obstructs fluid flow through the main flow passage. An evacuated bellows is coupled to the valve element and configured to move the valve element from the open position to the closed position to maintain the air cavity above a predetermined pressure threshold to thereby prevent cavitation from occurring within the pump.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following Detailed Description is merely exemplary in nature and is not intended to limit the invention or the application and uses of the invention. Furthermore, there is no intention to be bound by any theory presented in the preceding Background or the following Detailed Description.

Figure 1:
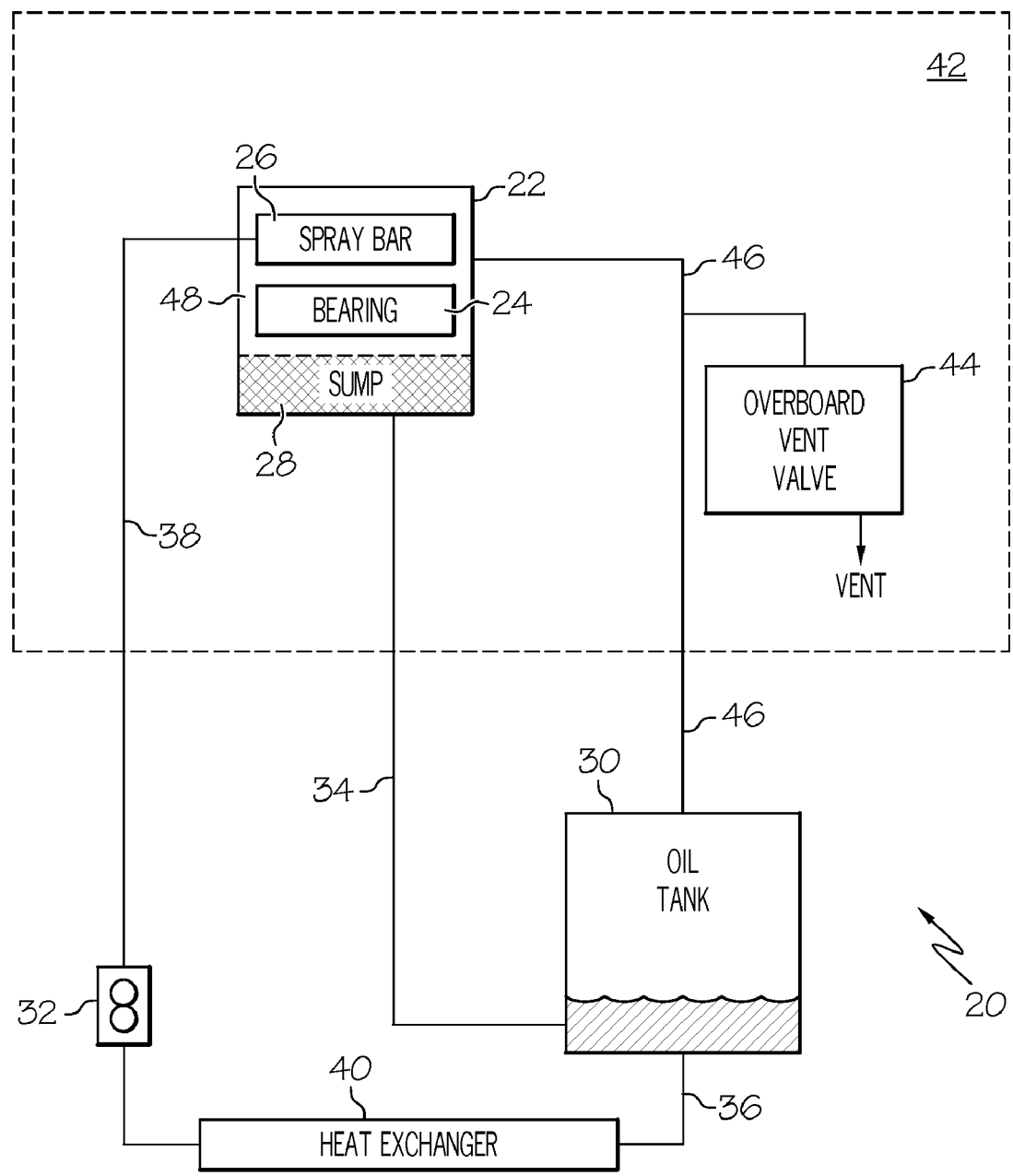
FIG. 1 is a schematic block diagram of an aircraft bearing lubrication system including an overboard vent valve in accordance with a first exemplary embodiment.

FIG. 1 is a schematic drawing of an aircraft bearing lubrication system 20 in accordance with a first exemplary embodiment. Bearing lubrication system 20 includes a bearing housing 22 containing at least one bearing 24 that may support a rotating shaft associated with an aircraft's gas turbine engine. To ensure the proper functioning of bearing 24, bearing lubrication system 20 is equipped with a circulation subsystem that continually circulates a lubricant, such as oil, over bearing 24. In the illustrated exemplary embodiment, the circulation subsystem includes a spray bar 26 mounted in bearing housing 22, a sump 28 formed in the bottom of bearing housing 22, an oil tank 30, and a supply pump 32. Sump 28 is fluidly coupled to oil tank 30 via a first conduit 34, oil tank 30 is fluidly coupled to supply pump 32 via a second conduit 36, and supply pump is fluidly coupled to spray bar 26 via a third conduit 38. When supply pump 32 is energized, oil is drawn from oil tank 30, flows through conduit 36, and is received by supply pump 32. If desired, a heat exchanger 40 may be disposed between oil tank 30 and pump 32 to cool the oil flowing therethrough. From supply pump 32, the oil flows through conduit 38 and into spray bar 26. The oil is then directed over bearing 24 by spray bar 26 and subsequently collects in sump 28. Finally, the oil flows from sump 28, through conduit 34, and returns to the reservoir held in oil tank 30. This process is continually repeated to maintain bearing 24 in a lubricated state.

It will be appreciated that the circulation subsystem described above is a simplified example; actual embodiments of the circulation subsystem, and bearing lubrication system 20 as a whole, may include additional standardized components (e.g., one or more filters) that are not shown in FIG. 1 for clarity. It will further be appreciated that components of the circulation subsystem may be varied as desired without departing from the spirit and scope of the invention. In this respect, spray bar 26 may be replaced with any device suitable for directing oil over bearing 24 including, for example, one or more outlets positioned above bearing 24.

Bearing housing 22 and an overboard vent valve 44 comprise a pressure-regulated bearing assembly 42. A vent line 46 fluidly couples overboard vent valve 44 to an air cavity 48 provided in bearing housing 22. If desired, vent line 46 may also fluidly couple overboard vent valve 44 to oil tank 30 in the manner shown in FIG. 1. As noted above, the pressure within air cavity 48 varies in relation to atmospheric pressure due, in part, to leakage across one or more non-illustrated seals associated with aircraft bearing lubrication system 20. Thus, as an aircraft carrying lubrication system 20 ascends to high flight altitudes, the pressure within air cavity 48 decreases correspondingly. If the pressure within air cavity 48 becomes too low, cavitation may occur within pump 32. Overboard vent valve 44 thus controls the flow of air from air cavity 48 to ambient pressure to maintain the pressure within air cavity 48 above a predetermined minimum pressure threshold to prevent cavitation. In certain embodiments, overboard vent valve 44 may also maintain the pressure within air cavity 48 below a predetermined upper pressure threshold to prevent downstream oil leakage. To this end, overboard vent valve 44 may comprise any valve suitable for selectively venting air cavity 48 in relation to the pressure within air cavity 48. For purposes of illustration, two exemplary embodiments of overboard vent valves suitable for use as overboard vent valve 44 will now be described in conjunction FIGS. 2-5.

Figure 2:
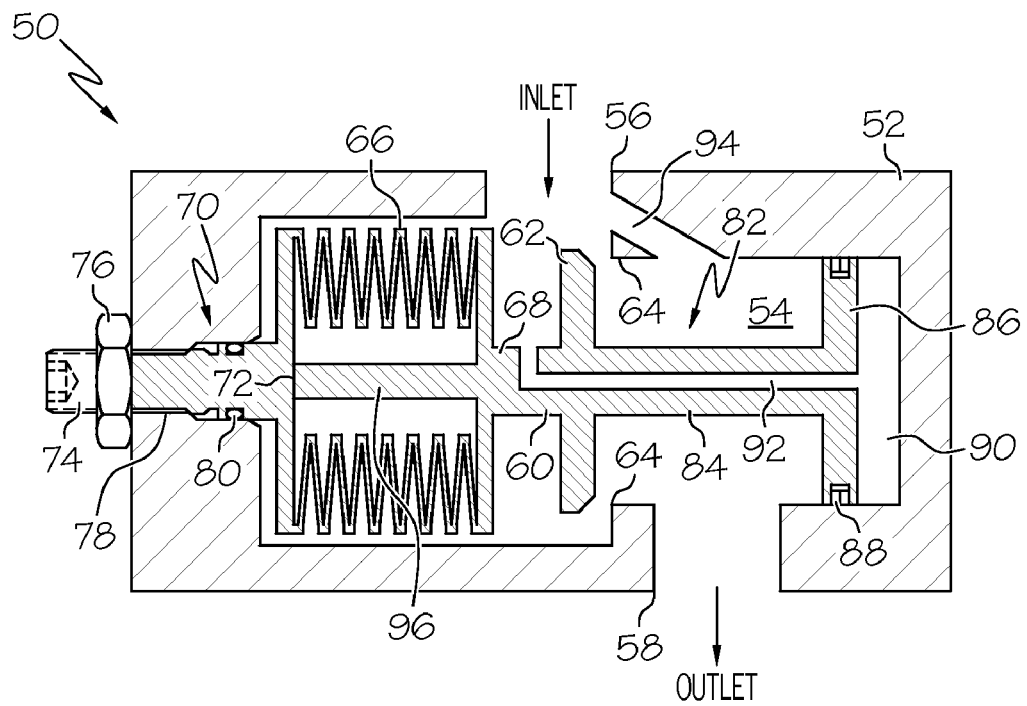
FIGS. 2 and 3 are cross-sectional views of a first exemplary overboard vent valve in open and closed states, respectively, suitable for use in conjunction with the aircraft bearing lubrication system shown in FIG. 1.
Figure 3:
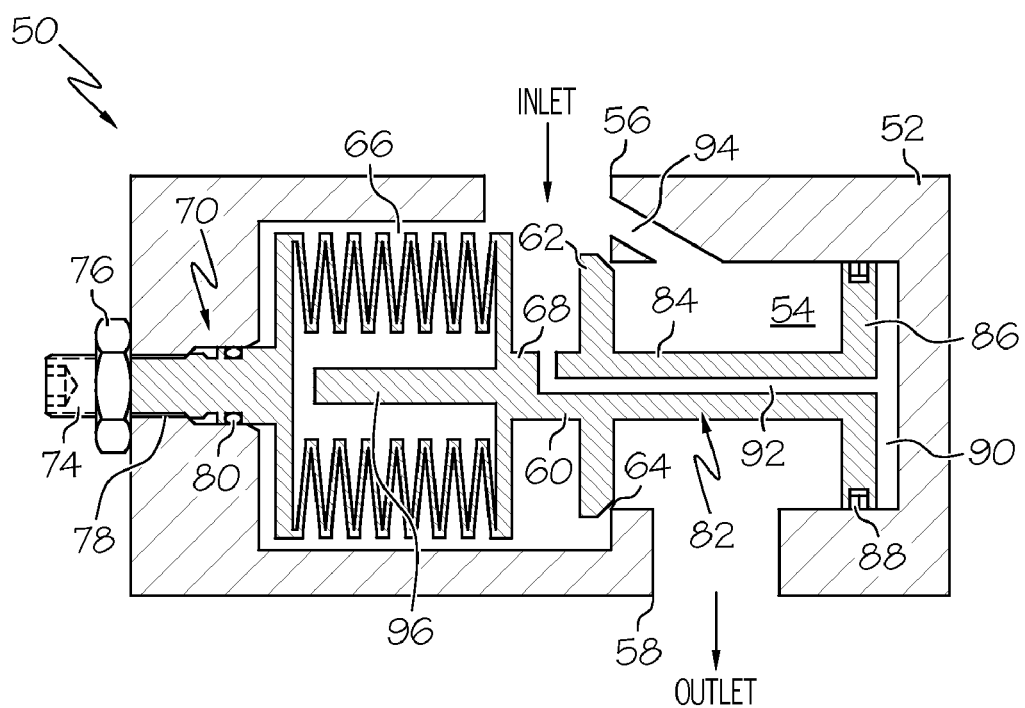

FIGS. 2 and 3 are cross-sectional views of a first exemplary overboard vent valve 50 in open and closed states, respectively, suitable for use as vent valve 44 of aircraft bearing lubrication system 20 (FIG. 1). In this example, overboard vent valve 50 includes a valve housing 52 (e.g., aluminum, stainless steel, etc.) having a main flow passage 54 therethrough. An outlet 58 of main flow passage 54 is fluidly coupled to ambient pressure, and an inlet 56 of main flow passage 54 is fluidly coupled to the air cavity provided in the bearing housing. For example, with reference to FIG. 1, inlet 56 may be fluidly coupled to air cavity 48 provided in bearing housing 22 via vent line 46. As indicated above, inlet 56 may also be fluidly coupled to oil tank 30 via vent line 46. A valve element 60 is mounted within valve housing 52 proximate main flow passage 54. Valve element 60 may be moved between the following positions: (i) an open position (FIG. 2) wherein valve element 60 does not substantially impede airflow through main flow passage 54, (ii) a closed position (FIG. 3) wherein valve element 60 substantially impedes fluid flow through main flow passage 54, and (iii) various intermediate positions.

Valve element 60 may comprise any selectively-movable body suitable for reducing fluid flow through flow passage 54, including, for example, a butterfly valve element. However, as shown in FIGS. 2 and 3, valve element 60 is preferably a poppet-style valve element of the type which includes a translating seating member 62. When valve element 60 is in the closed position (FIG. 3), seating member 62 contacts a seating surface 64 provided within valve housing 52 to form a substantially annular seal (e.g., a metal-to-metal seal). If desired, seating member 62 may be conical or otherwise tapered to better form a seal with seating surface 64.

An evacuated bellows 66 (e.g., stainless steel, a nickel-based alloy, etc.) is mounted within valve housing 52 and coupled to valve element 60. In the illustrated exemplary embodiment, bellows 66 is coupled between an end portion 68 of valve element 60 and a bellows support element 70. Bellows support element 70 may take the form of any structure suitable for maintaining bellows 66 in a desired position (e.g., an inner wall of valve housing 52). Bellows support element 70 may be fixed relative valve housing 52; however, it is preferred that bellows support element 70 is movable relative to valve housing 52. In this respect, bellows support element 70 may include a position adjustment feature that is manually accessible from the exterior of valve housing 52. As indicated in FIGS. 2 and 3, such a position adjustment feature may comprise a threaded shaft 74 coupled to an end of bellows 66 opposite valve element 60. Threaded shaft 74 extends away from bellows 66 and through an opening 78 provided in valve housing 52 such that an end portion of shaft 74 is manually accessible from the exterior of valve housing 52. If desired, packing 80 (e.g., one or more elastomeric o-rings) may be disposed around shaft 74 to minimize leakage through opening 78. A locknut 76 is disposed around shaft 74 and abuts an external surface of valve housing 52 adjacent opening 78. A technician may turn threaded locknut 76 or shaft 74 (e.g., utilizing an Allen wrench or other such tool) to move bellows support element 70, and therefore bellows 66, relative to valve housing 52. By turning locknut 76 or threaded shaft 74 in this manner, the position of valve element 60, and thus the distance between seating member 62 and seating surface 64, may be adjusted to calibrate overboard vent valve 50 to a desired set of operational parameters.

In a preferred embodiment, overboard vent valve 50 further includes a translatable piston that guides the movement of valve element 60 and/or provides pressure balancing. For example, as shown in FIGS. 2 and 3, overboard vent valve 50 may comprise a piston 82 including a piston head 86 and a piston shaft 84, which is coupled to (e.g., integrally formed with) valve seating member 62. Piston 82 further includes a piston seal 88 (e.g., carbon, polytetrafluoroethylene, etc.), which may be disposed around piston head 86 and sealingly engage an inner surface of valve housing 52. Piston head 86 and valve housing 52 cooperate to form a pressure balance chamber 90 that is fluidly coupled to main flow passage 54 via at least one channel 92 formed through piston 82. As noted above, piston 82 guides the movement of valve element 60 as element 60 translates within valve housing 52. In addition, piston 82 may help pressure balance overboard vent valve 50 and thereby reduce the affects of pressure imbalances occurring between inlet 56 and outlet 58. To optimize pressure balancing, the sealing area of piston 82 (in particular, the sealing area of piston seal 88) is designed to be substantially equivalent to the seating area of seating member 62. For example, if piston 82 includes a substantially annular sealing surface and valve element 60 includes a substantially annular seating surface, the diameter of the sealing surface of piston 82 may be substantially equivalent to the diameter of the seating surface of valve element 60.

Evacuated bellows 66 functions as an absolute pressure sensing device. Advantageously, bellows 66 provides a constant effective area, actuates at relatively low pressures, and exhibits little to no leakage (thus ensuring that bellows 66 remains evacuated over the life of overboard vent valve 50). Evacuated bellows 66 is designed to maintain valve element 60 in the open position (or in an intermediate position) when the inlet pressure, and thus the pressure within air cavity 48 (FIG. 1), is above a predetermined minimum pressure threshold. When the pressure at inlet 56 is above the predetermined minimum pressure threshold, the external pressure acting on the effective area of bellows 66 is sufficient to maintain bellows 66 in a compressed (or semi-compressed) state and valve element 60 in an open position (FIG. 2). If desired, valve element 60 may be provided within a full open stop feature 96, which extends from an end of valve element 60 and abuts an inner portion of bellows 66 when bellows 66 is in a compressed state, to thereby maintain valve element 60 in a desired full open position as shown in FIG. 2 at 72. When the pressure at inlet 56 falls below the predetermined minimum pressure threshold, the external pressure acting on bellows 66 is no longer sufficient to maintain bellows 66 in a compressed state. Bellows 66, which exhibits a spring-like resiliency, consequently expands, and valve element 60 moves into the closed position (FIG. 3).

It should thus be appreciated that overboard vent valve 50 may be configured to transition into the closed position when the pressure at inlet 56, indicative of the pressure within air cavity 48, surpasses a predetermined minimum pressure threshold. The predetermined minimum pressure threshold is chosen to correlate to a minimum pressure value within air cavity 48 required for pump cavitation to occur. As a non-limiting example, overboard vent valve 50 may be configured to close when the pressure within air cavity 48 is between 4.8 to 3.8 pounds per square inch absolute. By closing and thereby reducing the venting of air cavity 48 at a predetermined pressure, overboard vent valve 50 may maintain the pressure within air cavity 48 (FIG. 1) above a predetermined minimum pressure value (e.g., 3.8 pounds per square inch absolute) below which pump cavitation may occur.

If fluid flow through main flow passage 54 were completely halted when overboard vent valve 50 transitions into the closed position, the pressure within air cavity 48 may increase to an undesirably high level and oil may leak from the circulation subsystem. It is thus preferred that overboard vent valve 50 is configured to permit a reduced airflow through main flow passage 54 when valve element 60 is in the closed position so as to maintain the pressure within cavity 48 below a predetermined upper pressure threshold. This may be accomplished by providing one or more closed flow orifices within valve housing 52 to permit airflow from inlet 56 to outlet 58 when valve element 60 is in the closed position (FIG. 2) as generally shown in FIGS. 2 and 3 at 94.

Figure 4:
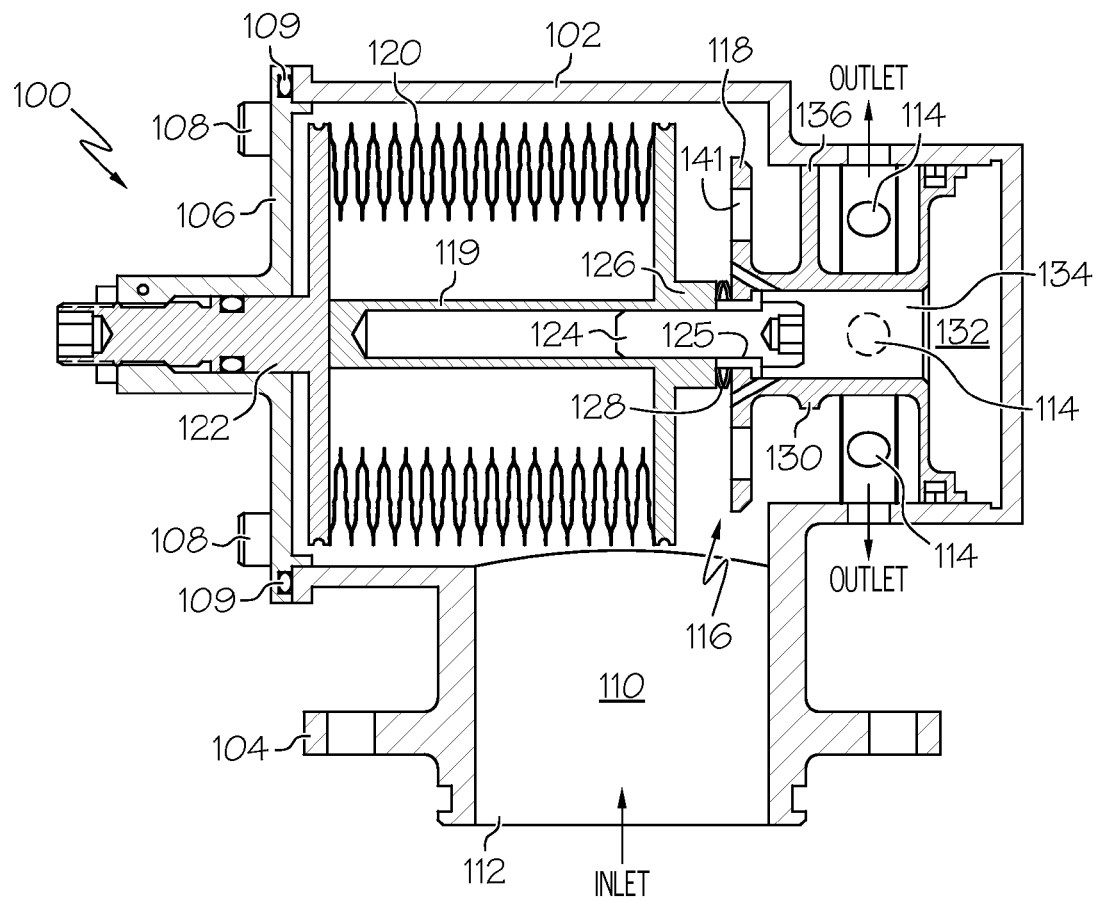
FIGS. 4 and 5 are cross-sectional and side plan views, respectively, of a second exemplary overboard vent valve suitable for use in conjunction with the aircraft bearing lubrication system shown in FIG. 1.
Figure 5:
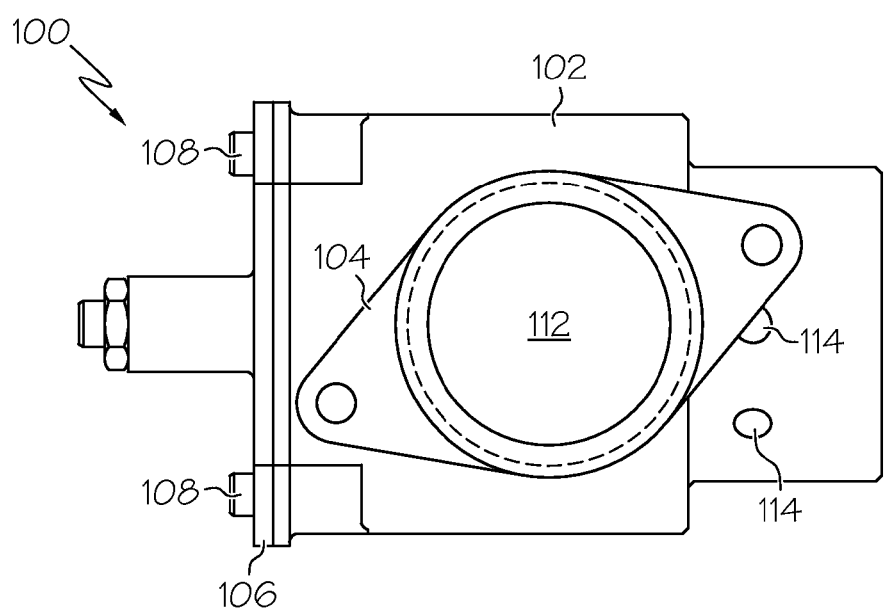

There has thus been described an exemplary overboard vent valve, and an aircraft bearing lubrication system employing such a valve, which regulates the pressure within the air cavity of a bearing housing. It should be appreciated that the overboard vent valve described above in conjunction with FIGS. 2 and 3 is only one example of the various embodiments that the vent valve may assume. To further illustrate this point, FIGS. 4 and 5 are cross-sectional and side plan views, respectively, of a second exemplary overboard vent valve 100 suitable for use as overboard vent valve 44 of aircraft bearing lubrication system 20 shown in FIG. 1. Overboard vent valve comprises a valve housing 102, which includes a mounting flange 104. A cover 106 is coupled to housing 102 via a plurality of fasteners 108 (e.g., cap screws). Packing 109 (e.g., an elastomeric o-ring) may be provided between valve housing 102 and cover 106 to minimize leakage. A main flow passage 110 is formed through housing 102 and includes an inlet 112 and an outlet, which, in this exemplary case, comprises a plurality of outlet apertures 114 circumferentially spaced around a portion of housing 102.

As was the case previously, a valve element 116 is mounted within main flow passage 110 of valve housing 102 and configured to move between (i) an open position (FIG. 4) wherein valve element 116 does not substantially impede airflow through main flow passage 110, (ii) a closed position (FIG. 3) wherein valve element 60 substantially impedes fluid flow through main flow passage 110, and (iii) various intermediate positions. As indicated in FIG. 4, valve element 116 may be a poppet-style valve element including a seating member 118 and a full open stop feature 119. An evacuated bellows 120 is mounted within valve housing 102 and coupled between an end of valve element 116 and a bellows support structure 122. Evacuated bellows 120 is similar to bellows 66 described above in conjunction with FIGS. 2 and 3 and will thus not be described in detail herein. However, it should be noted that, in contrast to bellows 66 of overboard vent valve 50 (FIGS. 2 and 3), bellows 120 is not integrally formed with valve element 116. Instead, bellows 66 is movably coupled to valve element 116 via a cap screw 124, which may pass through an opening provided in seating member 118. If desired, a bushing 125 may be disposed between cap screw 124 and seating member 118 to reduce friction and to accommodate axial misalignment. The head of cap screw 124 is larger than the opening provided through seating member 118 and thus pulls valve element 116 toward bellows 120 when bellows 120 is in a compressed state (FIG. 4). Conversely, when bellows 120 expands, cap screw 124 slides through the opening in valve element 116 such that end portion 126 of bellows 120 contacts seating member 118 (or an element positioned between seating member 118 and bellows 120). Preferably, a resilient member 128 (e.g., a wave spring) is disposed between end portion 126 and seating member 118 to compensate for over-travel and prevent hard contact between bellows 120 and seating member 118.

A piston 130 is coupled to valve element 116. Piston 130 is slidably mounted within valve housing 102 and cooperates therewith to form a pressure balance chamber 132. Again, pressure balance chamber 132 is fluidly coupled to main flow passage 110 via at least one channel 134. In this exemplary case, channel 134 comprises not only a passageway formed through the shaft and head of piston 130 but also a plurality of through holes formed (e.g., drilled) through seating member 118 of valve element 116. As indicated above, piston 130 serves to pressure balance overboard vent valve 100 to significantly reduce the effect of pressure imbalances between inlet 112 and outlet apertures 114. Preferably, the sealing area of piston 130 is chosen to be substantially equivalent to the seating area of seating member 118. As also indicated above, piston 130 also serves to guide the movement of valve element 116. In this respect, piston 130 may further include one or more projections 136, which extend radially from the shaft of piston 130 to contact the inner surface of valve housing 102.

Overboard vent valve 100 operates in substantially the same manner as does overboard vent valve 50 described above in conjunction with FIGS. 2 and 3. That is, overboard vent valve 100 is configured to transition to the closed position when the inlet pressure indicates that the pressure within air cavity 48 (FIG. 1) has fallen below a predetermined pressure threshold. In this manner, overboard vent valve 100 may maintain the pressure within air cavity 48 above a minimum pressure value and thereby prevent pump cavitation from occurring. Again, overboard vent valve 100 is preferably provided with at least one closed flow orifice to permit a reduced airflow when valve element 116 is in the closed position. For example, a plurality of through holes may be provided through seating member 118 as generally shown in FIG. 4 at 141. By permitting a reduced venting when valve element 116 is in the closed position, overboard vent valve 100 may maintain the pressure within cavity 48 below a predetermined upper pressure threshold and thereby prevent the leakage of oil.

Considering the foregoing, it should be appreciated that there has been provided an overboard vent valve, and an aircraft bearing lubrication system employing such a vent valve, which maintains the pressure of the air cavity within the lubrication system's bearing housing above a predetermined minimum pressure threshold to prevent pump cavitation. In at least one embodiment, the overboard vent valve also maintains the pressure within the bearing housing air cavity below a predetermined upper pressure threshold to minimize oil leakage. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A pressure-regulated bearing assembly for deployment within an aircraft bearing lubrication system, comprising:
    a bearing housing having an air cavity therein; and
    a vent valve, comprising:
        a valve housing;
        a main flow passage having an inlet coupled to the air cavity and an outlet through which pressurized airflow is vented overboard;
        a valve element disposed within the main flow passage and configured to move between (i) an open position and (ii) a closed position; and
        a bellows coupled to the valve element and having an external surface over which the fluid received through the inlet of the main flow passage flows, the bellows configured to move the valve element from the open position to the closed position when the pressure within the air cavity surpasses a predetermined pressure threshold to control the flow of air from the air cavity to ambient pressure to maintain the pressure within the air cavity above the predetermined pressure threshold.

2. A pressure-regulated bearing assembly according to claim 1 wherein the bellows is evacuated.

3. A pressure-regulated bearing assembly according to claim 1 wherein the vent valve is pressure balanced.

4. A pressure-regulated bearing assembly according to claim 3 wherein the vent valve further comprises:
    a piston coupled to the valve element and slidably mounted in the valve housing, the piston cooperating with the valve housing to form a pressure balance chamber; and
    a channel formed through the piston, the channel fluidly coupling the pressure balance chamber to the main flow passage.

5. A pressure-regulated bearing assembly according to claim 4 wherein the valve element includes a seating surface, and wherein the piston includes a sealing surface, the area of the seating surface and the area of the sealing surface being substantially equivalent.

6. A pressure-regulated bearing assembly according to claim 1 wherein the vent valve further includes a closed flow orifice formed through at least one of the valve housing and the valve element.

7. A pressure-regulated bearing assembly according to claim 1 further comprising a bellows support structure disposed in the valve housing, the bellows coupled between the bellows support structure and the valve element.

8. A pressure-regulated bearing assembly according to claim 7 wherein the bellows support structure is movable with respect to the valve housing.

9. A pressure-regulated bearing assembly according to claim 8 wherein the bellows support structure comprises a position adjustment feature manually accessible from the exterior of the valve housing.

10. A pressure-regulated bearing assembly according to claim 9 wherein the valve housing includes an opening formed therein, and wherein the position adjustment feature comprises a threaded shaft disposed through the opening.

11. A pressure-regulated bearing assembly according to claim 1 wherein the valve element is a poppet-style valve element.

12. A pressure-regulated bearing assembly according to claim 1 wherein the predetermined pressure threshold is between approximately 3.8 and 4.8 pounds per square inch absolute.

13. A pressure-regulated bearing assembly according to claim 1 further comprising a full open stop feature coupled to the valve element.

14. A pressure-regulated bearing assembly according to claim 1 further comprising:
    a vent line fluidly coupling the bearing housing to the vent valve; and
    an oil tank fluidly coupled to the vent line.

15. A pressure-regulated bearing assembly according to claim 1 further comprising a resilient member residing between the bellows and the valve element and configured to compensate for over-travel of the bellows.

16. An overboard vent valve for deployment within an aircraft bearing lubrication system including a bearing housing having an air cavity therein, the overboard vent valve comprising:
- a valve housing having a main flow passage including an inlet coupled to the air cavity and an outlet coupled to ambient pressure;
- a valve element disposed within the main flow passage and configured to move between (i) an open position and (ii) a closed position wherein the valve obstructs fluid flow through the main flow passage;
- an evacuated bellows coupled to the valve element and configured to move the valve element from the open position to the closed position when the inlet pressure falls below a predetermined pressure threshold; and
- a pressure balance device mounted in the valve housing and coupled to the valve element.

17. An overboard vent valve according to claim 16 wherein the pressure balance device comprises:
- a piston coupled to the valve element and slidably mounted in the valve housing, the piston cooperating with the valve housing to form a pressure balance chamber; and
- a channel formed through the piston, the channel fluidly coupling the pressure balance chamber to the main flow passage to pressure balance the valve element.

18. An overboard vent valve according to claim 16 wherein the piston includes a substantially annular sealing surface, and wherein the valve element comprises a substantially annular seating surface, the substantially annular sealing surface having a diameter approximately equivalent to the diameter of the substantially annular seating surface.

19. An aircraft bearing lubrication system for lubricating a bearing with a lubricant, comprising:
- a bearing housing including a sump and an air cavity, the bearing housing supporting the bearing;
- a circulation subsystem including a lubricant inlet fluidly coupled to the sump and a lubricant outlet positioned so as to direct lubricant over the bearing, the circulation subsystem conducting lubricant from the lubricant inlet to the lubricant outlet; and
- an overboard vent valve, comprising:
    - a valve housing having a main flow passage including an inlet coupled to the air cavity and an outlet coupled to atmospheric pressure;
    - a valve element disposed within the main flow passage and configured to move between (i) an open position and (ii) a closed position wherein the valve obstructs fluid flow through the main flow passage; and
    - an evacuated bellows coupled to the valve element and configured to move the valve element from the open position to the closed position to maintain the air cavity above a predetermined pressure threshold to thereby prevent cavitation from occurring within the pump.

* * * * *